(12) United States Patent
Kaseda

(10) Patent No.: US 8,780,375 B2
(45) Date of Patent: Jul. 15, 2014

(54) PRINTING SYSTEM

(75) Inventor: Takumi Kaseda, Ota-ku (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 476 days.

(21) Appl. No.: 13/278,697

(22) Filed: Oct. 21, 2011

(65) Prior Publication Data

US 2012/0105897 A1   May 3, 2012

(30) Foreign Application Priority Data

Oct. 29, 2010   (JP) ................................. 2010-243761

(51) Int. Cl.
*G06K 15/02* (2006.01)
(52) U.S. Cl.
USPC .......................... 358/1.14; 358/1.13; 358/1.18
(58) Field of Classification Search
USPC ......... 358/1.13, 1.14, 1.18; 713/153; 395/701
See application file for complete search history.

(56) References Cited

U.S. PATENT DOCUMENTS

| 7,515,180 | B2 * | 4/2009 | Wada | 348/231.2 |
|---|---|---|---|---|
| 8,266,527 | B2 | 9/2012 | Matsuura | |
| 8,284,442 | B2 | 10/2012 | Minami | |
| 2002/0194134 | A1 * | 12/2002 | Ohtsuka | 705/57 |
| 2005/0052677 | A1 | 3/2005 | Maruyama | |
| 2009/0097645 | A1 * | 4/2009 | Harris | 380/201 |
| 2010/0131753 | A1 * | 5/2010 | Ha | 713/153 |

FOREIGN PATENT DOCUMENTS

| JP | 2005-071175 A | 3/2005 |
|---|---|---|
| JP | 2006-011916 A | 1/2006 |
| JP | 2008-146261 A | 6/2008 |
| JP | 2009-193248 A | 8/2009 |
| JP | 2010-026743 A | 2/2010 |
| JP | 2010-122822 A | 6/2010 |

OTHER PUBLICATIONS

Office Action (Notification of Reason for Rejection) dated Oct. 23, 2012, issued by the Japanese Patent Office in the corresponding Japanese Patent Application No. 2010-243761 and an English translation thereof. (8 pages).

* cited by examiner

*Primary Examiner* — Allen H Nguyen
(74) *Attorney, Agent, or Firm* — Buchanan Ingersoll & Rooney PC

(57) ABSTRACT

A printing system that performs printout based on encrypted, submitted data includes a printing apparatus including a decrypting unit that decrypts the submitted data; and an editing apparatus that accepts an editing operation to be performed on the submitted data. The editing apparatus transmits an execution instruction for performing a process of creating an image for editing used for the editing operation, to the printing apparatus. In response to the execution instruction, the printing apparatus performs a process on an image obtained by decrypting the submitted data using the decrypting unit, and thereby creates a non-equivalent decrypted image as the image for editing, and transmits the non-equivalent decrypted image to the editing apparatus, the non-equivalent decrypted image being a decrypted image non-equivalent to a printed material related to the submitted data. The editing apparatus displays the non-equivalent decrypted image as the image for editing.

6 Claims, 12 Drawing Sheets

PRINTING SYSTEM

This application is based on Japanese Patent Application No. 2010-243761 filed on Oct. 29, 2010, the contents of which are hereby incorporated by reference.

BACKGROUND OF THE INVENTION

1. Field of the Invention

The present invention relates to a printing system.

2. Description of the Background Art

There exist systems for transmitting (submitting) data on printed materials (electronic documents) from an orderer's apparatus to an apparatus in a printing company (order receiver's apparatus) over a network (see, for example, Japanese Patent Application Laid-Open No. 2006-11916).

Of such systems, there exists a system that allows only a decrypting unit included in a printing apparatus in a printing company to decrypt submitted data in order to improve security. In this system, since only the printing apparatus can perform the decryption of the submitted data in the printing company, high security can be ensured.

However, in such a system, the printing company side (the order receiver side) cannot make revisions. Hence, even a very small revision requires the submitter side (the orderer side) to perform a revision operation and then transmit revised data again to the printing company side. As such, the system has a problem of low flexibility in revision.

SUMMARY OF THE INVENTION

An object of the present invention is to provide a printing system capable of improving flexibility in revision while ensuring security.

A first aspect of the present invention is directed to a printing system that performs printout based on encrypted, submitted data, the printing system including: a printing apparatus including a decrypting unit that decrypts the submitted data; and an editing apparatus that accepts an editing operation to be performed on the submitted data, wherein the editing apparatus transmits an execution instruction for performing a process of creating an image for editing used for the editing operation, to the printing apparatus, in response to the execution instruction, the printing apparatus performs a process on an image obtained by decrypting the submitted data using the decrypting unit, and thereby creates a non-equivalent decrypted image as the image for editing, and transmits the non-equivalent decrypted image to the editing apparatus, the non-equivalent decrypted image being a decrypted image non-equivalent to a printed material related to the submitted data, and the editing apparatus displays the non-equivalent decrypted image as the image for editing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing schematic configurations of an editing apparatus and the like;

DESCRIPTION OF THE PREFERRED EMBODIMENTS

An embodiment of the present invention will be described below based on the drawings.

<1. System Configuration>

Figure 1:
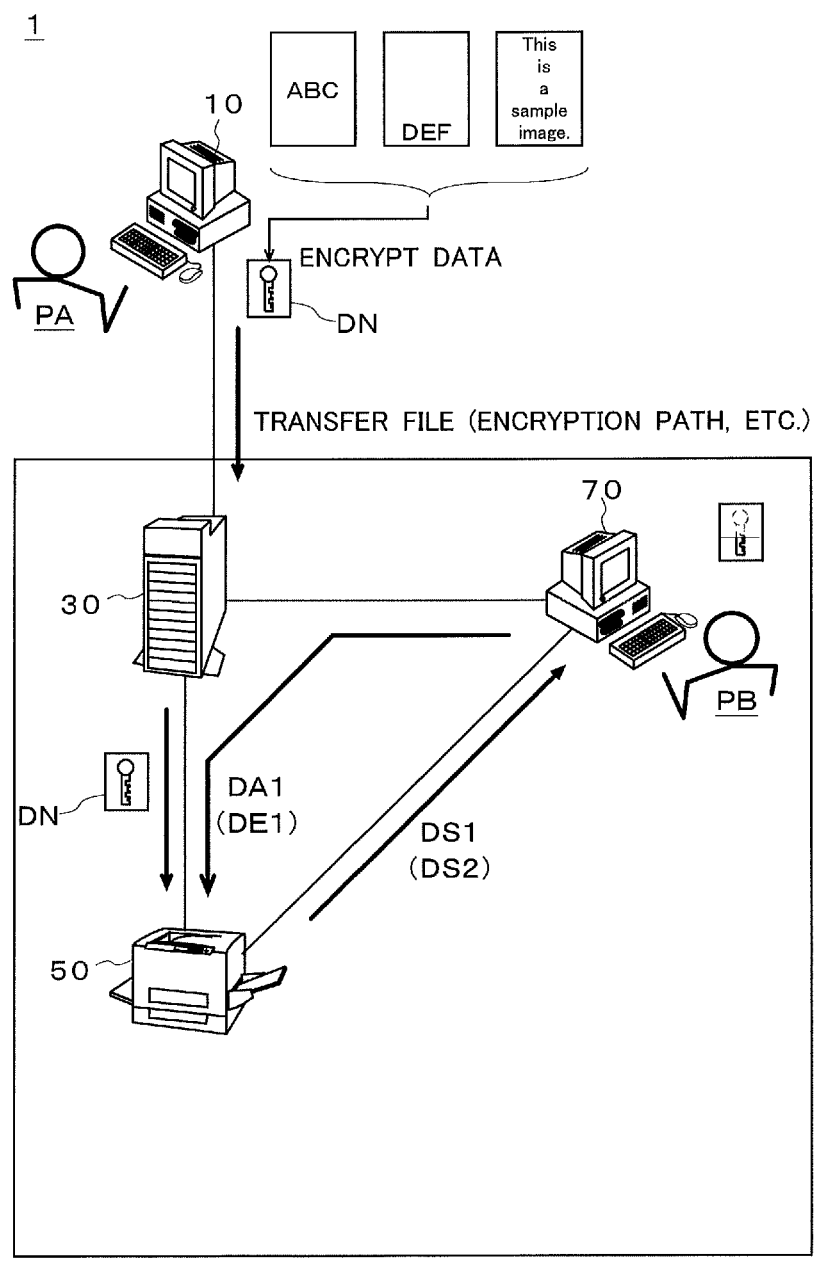
FIG. 1 is a schematic diagram showing a configuration of a printing system.

FIG. 1 is a schematic diagram showing a configuration of a printing system 1.

As shown in FIG. 1, the printing system 1 includes a submitter's terminal 10, a submitted-data store (submitted-data storage apparatus) 30, a printing apparatus 50, and an editing apparatus 70. The submitter's terminal 10 is placed in an orderer's company, and the submitted-data store 30, the printing apparatus 50, and the editing apparatus 70 are placed in an order receiver's company (a printing company, etc.).

The printing system 1 is a system that performs printout based on submitted data DN. Specifically, a data file (also referred to as submitted data) DN which is encrypted using the submitter's terminal 10 is transferred from the submitter's terminal 10 to the submitted-data store 30 over a network, etc. Since the submitted data DN is encrypted, the submitted data DN can be transmitted from the submitter's terminal 10 to the submitted-data store 30, with secrecy conditions being ensured. Note that to more securely ensure the secrecy of data, it is more preferable to use a predetermined encryption path and the like, as a transmission path, in addition to encryption of submitted data itself for secrecy.

Thereafter, the submitted data DN is decrypted (the encryption state is reset) using a decrypting unit 63 included in the printing apparatus 50 (see FIG. 2), and is then printed out by the printing apparatus 50. By this, printout materials related to the submitted data DN are produced.

In addition, the printing system 1 can perform, prior to the printout, an editing process for the submitted data DN, using the editing apparatus 70 and the like. Note, however, that in the printing system 1, a decryption process for the submitted data DN is performed only by the printing apparatus 50 (specifically, the decrypting unit 63 included therein) among a plurality of apparatuses (specifically, the submitted-data store 30, the printing apparatus 50, and the editing apparatus 70) placed in the order receiver's company (a printing company, etc.). The editing apparatus 70 does not have a decrypting unit and thus a decryption process for the submitted data DN is not performed by the editing apparatus 70. Images for editing which are displayed on an editing screen during an editing process are created, involving a decryption process using the decrypting unit 63 in the printing apparatus 50. Such an editing process will be described in detail later.

Figure 2:
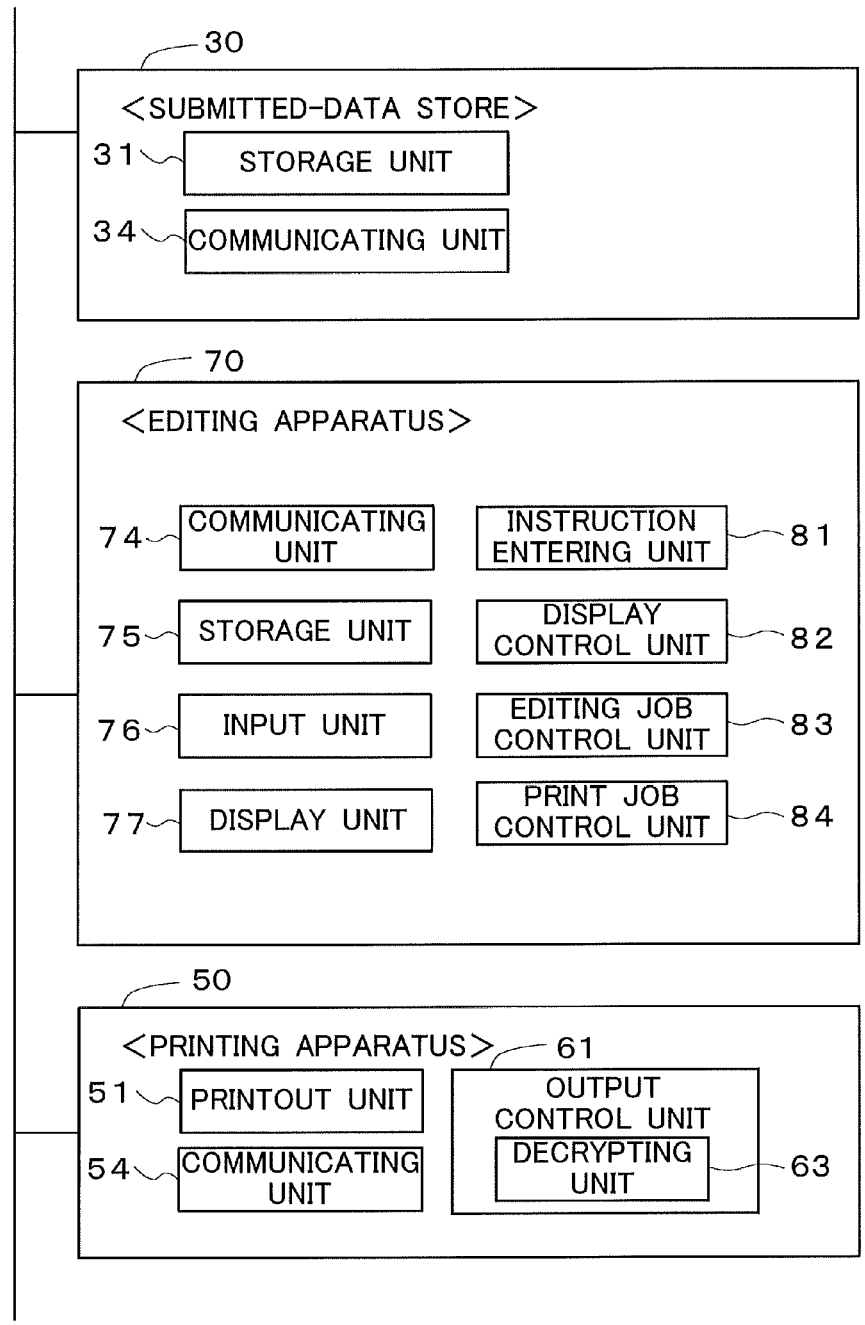

FIG. 2 is a block diagram showing schematic configurations of the submitted-data store 30, the printing apparatus 50, and the editing apparatus 70.

The editing apparatus 70 is an apparatus that accepts an editing operation to be performed on submitted data DN. The editing apparatus 70 includes a communicating unit 74, a storage unit 75, an input unit 76, a display unit 77, an instruction entering unit 81, a display control unit 82, an editing job control unit 83, a print job control unit 84 and the like. The editing apparatus 70 implements various functions by allowing those units to operate in an integrated manner.

The communicating unit 74 is a processing unit that performs network communications. The network communications use various protocols such as TCP/IP (Transmission Control Protocol/Internet Protocol) and FTP (File Transfer Protocol). The use of the network communications enables the editing apparatus 70 to exchange various data with the printing apparatus 50 and the submitted-data store 30. Note that a network that connects the editing apparatus 70, the printing apparatus 50, and the submitted-data store 30 is preferably an intra-company network where external communications are limited (a network designed for use only within the order receiver's company, etc.) in order to more securely ensure secrecy.

The storage unit 75 has a semiconductor memory and a storage device such as a hard disk drive (HDD). The storage unit 75 temporarily stores submitted data DN transmitted from the submitted-data store 30.

The input unit 76 has operation input devices (a keyboard, a mouse, etc.) that accept operation inputs performed on the editing apparatus 70.

The display unit 77 has a display output device (a liquid crystal display, etc.) that performs display output of various information.

The editing apparatus 70 is configured as a common personal computer and the like. Specifically, the editing apparatus 70 is configured as a computer system including a CPU, various semiconductor memories (a RAM, a ROM, etc.) and the like. Note that the submitter's terminal 10 is also likewise configured as a common personal computer and the like.

The editing apparatus 70 implements the instruction entering unit 81, the display control unit 82, the editing job control unit 83, and the print job control unit 84 by executing predetermined software program (hereinafter, also simply referred to as program) PG1 using the CPU, etc.

The instruction entering unit 81 is a processing unit that accepts various instructions (an editing instruction, a print instruction, etc.) from an operator PB of the editing apparatus 70. The display control unit 82 is a processing unit that controls the operation of displaying various information on the display unit 77.

The editing job control unit 83 is a processing unit that controls an operation according to an editing instruction provided from the operator PB of the editing apparatus 70. The editing job control unit 83 controls the above-described operation in cooperation with the instruction entering unit 81, the display control unit 82, the communicating unit 74, the storage unit 75, the input unit 76, the display unit 77, etc.

The print job control unit 84 is a processing unit that controls an operation according to a print instruction provided from the operator PB of the editing apparatus 70. The print job control unit 84 controls the above-described operation in cooperation with the instruction entering unit 81, the display control unit 82, the communicating unit 74, the storage unit 75, the input unit 76, the display unit 77 and the like.

The submitted-data store (submitted-data storage apparatus) 30 includes a data storage unit 31 including a mass-storage medium such as a hard disk; and a communicating unit 34. In the data storage unit 31, submitted data (encrypted data) transmitted from the submitter's terminal 10 is stored in a state in which the data remains encrypted (a secrecy state).

Furthermore, the printing apparatus 50 includes a printout unit 51 employing various schemes, a communicating unit 54, and an output control unit 61, and can produce (output) printout materials.

The output control unit 61 has the decrypting unit 63 that decrypts encrypted, submitted data DN. The output control unit 61 allows the decrypting unit 63 to decrypt submitted data DN which is in an encryption state and thereby generates data for printout. The printout unit 51 produces printout materials related to the submitted data DN, based on the data for printout.

In addition, the output control unit 61 also performs, for example, a process of creating "non-equivalent decrypted images" (described later) by performing a process on images obtained by decrypting submitted data DN using the decrypting unit 63, based on various instructions from the editing apparatus 70.

<2. Operations>
<2-1. Outline of Operations>

Next, the operations of the printing system 1 will be described.

As shown in FIG. 1, first, the submitter's terminal 10 encrypts data pertaining to printed materials (electronic documents, etc.) according to an operation input by a submitter PA, and thereby generates data having been encrypted (encrypted data). Then, the encrypted data is transmitted to the submitted-data store 30 from the submitter's terminal 10, as submitted data DN. Thereafter, in the printing system 1, an editing operation, etc., on the submitted data DN can also be performed using the editing apparatus 70 (without using the submitter's terminal 10).

Such an editing operation, etc., will be described in detail below.

Figure 3:
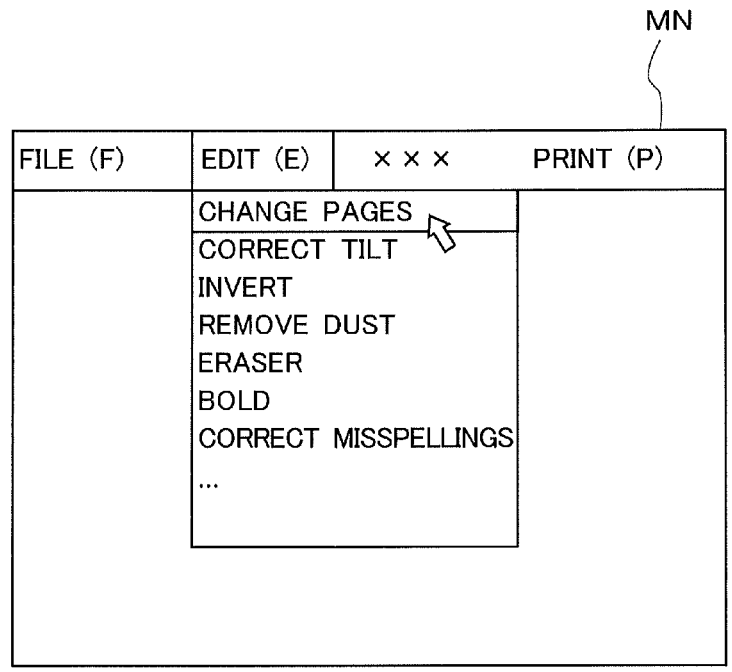
FIG. 3 is a diagram showing a menu screen.

In the editing apparatus 70, the aforementioned program PG1 is executed and a menu screen MN related to the program PG1 (see FIG. 3) is displayed.

The menu screen MN has various menu items (main items and sub-items). Specifically, the menu screen MN has main items such as "File", "Edit", and "Print", and further has sub-items as items under each main item. For example, the "Edit" menu has sub-items such as "Change Pages", "Correct Tilt", "Invert", "Remove Dust", "Eraser", "Bold", and "Correct Misspellings".

From among these menu items, appropriate menu items (a main item and a sub-item) are selected by mouse operations by the operator PB. Then, the editing apparatus 70 and the like perform processes relevant to the selected menu items. For example, when "Change Pages" in "Edit" is selected, a process related to a process of changing pages in printed materials (editing process) is performed. Alternatively, when "Remove Dust" in "Edit" is selected, a process related to a "Remove Dust" process in printed materials (editing process) is performed. Other processes pertaining to "Edit" are also similar to those described above; specifically, an editing process, etc., corresponding to a selected item are performed. When the menu item "Print" is selected, printed materials related to submitted data DN having been subjected to editing (e.g., subjected to a "Change Pages" process) are printed out.

In the following, first, editing operations and the like for "Change Pages" will be described.

<2-2. Editing Operations for "Change Pages">

Here, a situation is assumed in which the operator PB of the editing apparatus 70 has received, through contact by phone, email, or the like, a revision instruction from the submitter PA, specifically, a revision instruction for "moving page 3 to before page 1".

Figure 4:
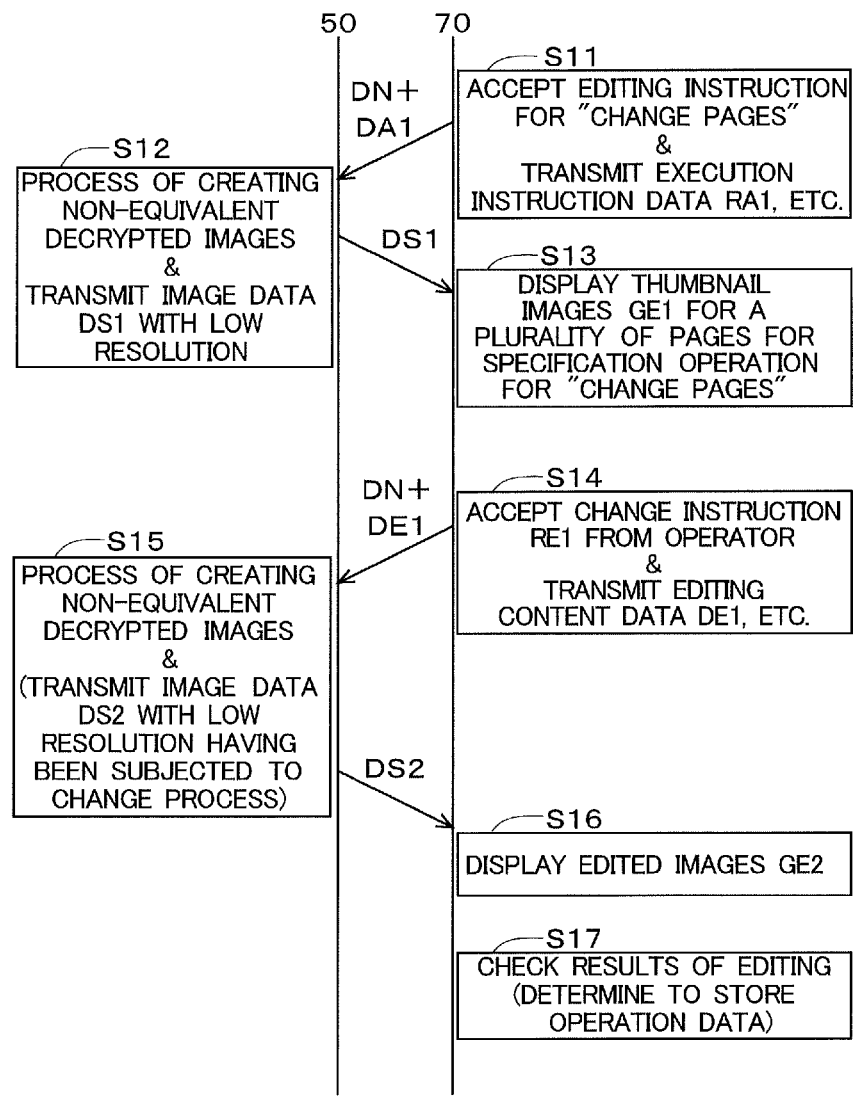
FIG. 4 is a diagram showing editing operations for "Change Pages"

FIG. 4 is a diagram showing operations performed after the reception of the revision instruction in such a situation.

First, the operator PB of the editing apparatus 70 selects "Change Pages" in "Edit" from among a plurality of menu items on the menu screen MN (FIG. 3) and provides an execution instruction RA1 for the selected item. In response to this selection operation, the editing apparatus 70 transmits submitted data (encrypted data) DN and execution instruction data DA (DA1) corresponding to the execution instruction RA1 to the printing apparatus 50 (step S11). Specifically, the editing apparatus 70 allows submitted data DN to be transferred from the submitted-data store 30 to the printing apparatus 50 and also transmits execution instruction data DA1 to the printing apparatus 50 (step S11). The execution instruction data (also simply referred to as an execution instruction) DA1 is instruction data for performing a process of creating images GE1 for editing used for an editing operation (a "Change Pages" operation), using the decrypting unit 63. Namely, the execution instruction DA1 is an instruction for creating images GE1 for editing. Note that the submitted data DN may be directly transmitted to the printing apparatus 50 from the submitted-data store 30 in response to a transmission instruction from the editing apparatus 70 or may be transmitted to the printing apparatus 50 via the editing apparatus 70. Likewise, the execution instruction DA1 may also be directly transmitted to the printing apparatus 50 from the editing apparatus 70 or may be transmitted to the printing apparatus 50 from the editing apparatus 70 via the submitted-data store 30.

In response to the execution instruction DA1, the printing apparatus 50 generates data DS1 for displaying the images GE1 for editing, based on the execution instruction DA1 and the submitted data DN (step S12).

Specifically, the printing apparatus 50 first decrypts a part or all (here, all) of the submitted data (encrypted data) DN using the decrypting unit 63. Then, the output control unit 61 of the printing apparatus 50 generates, as data DS1 for displaying the images GE1 for editing, data on "non-equivalent decrypted images" (described below) which are decrypted images non-equivalent to printed materials related to the submitted data DN.

More specifically, the output control unit 61 performs a resolution conversion process (resolution reduction process) on the temporarily decrypted image data and thereby generates image data DS1 with a reduced resolution. The image data DS1 is image data having a lower resolution than original image data DS0 pertaining to printed materials. Images related to the image data DS1 correspond to images decrypted as low-resolution images, in other words, images in which at least a part of information on their original images is substantially lost, and are non-equivalent to original images related to the image data DS0, and thus, are also referred to as "non-equivalent decrypted images". In addition, the "resolution reduction process" is a process of changing an image to be processed to an image (non-equivalent image) which is not equivalent to an image related to the image data DS0, and thus, is also represented as a "non-equivalence process". Note that the "non-equivalent decrypted image" is also represented as an image which is not in a state in which an original printed material is completely decrypted (a decrypted image in an incomplete decryption state), in short, an "incompletely decrypted image".

For example, when the submitted data DN has a plurality of (three) pages (see FIG. 1), the output control unit 61 generates, for each page, image data DS0 (e.g., image data having pixels, the number of which is equivalent to 300 dpi) obtained by temporarily decrypting the submitted data DN using the decrypting unit 63. The output control unit 61 further performs a resolution reduction process (e.g., a process of reducing the resolution by the order of a few to tens of percent) on each image data DS0 for each page, and thereby generates image data DS1 (e.g., image data having pixels, the number of which is equivalent to 10 dpi) which is image data of a "non-equivalent decrypted image". In short, thumbnail image data units DS1 are each generated for the corresponding original image data units DS0.

As such, the printing apparatus 50 performs a non-equivalence process on images (image data DS0) which are obtained by decrypting the submitted data DN using the decrypting unit 63, and thereby creates, as images GE1 for editing, non-equivalent decrypted images which are decrypted images non-equivalent to printed materials related to the submitted data DN.

Then, the printing apparatus 50 transmits the non-equivalent decrypted images to the editing apparatus 70, as the images GE1 for editing. Specifically, the printing apparatus 50 transmits, using the communicating unit 54 and the like, three image data units DS1 for three pages to the editing apparatus 70, as data for displaying the images GE1 for editing (step S12).

Figure 5:
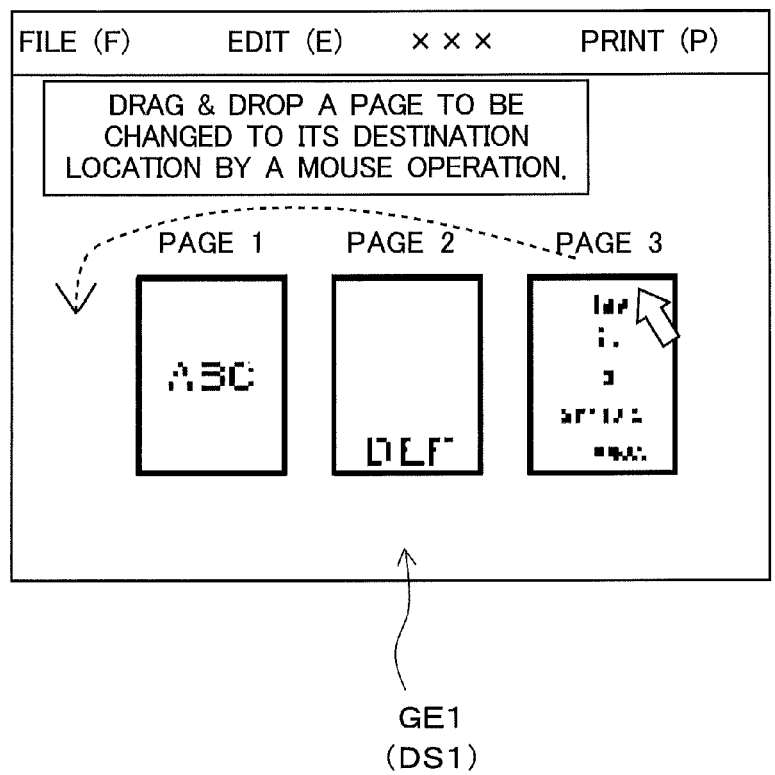
FIG. 5 is a diagram showing a screen on which images for editing are displayed.

When the editing apparatus 70 receives the data DS1 for display, the editing apparatus 70 displays the images GE1 for editing on the display unit 77 thereof, based on the data DS1 for display (step S13). In other words, the editing apparatus 70 displays "non-equivalent decrypted images" created based on the data DS1 for display, as the images GE1 for editing. For example, as shown in FIG. 5, three page images (thumbnail images) GE1 created based on the data DS1 for display are displayed on the display unit 77 so as to be sequentially arranged from the left to the right in page order.

Since image data DS1 for each page has a lower resolution than its original image data DS0, a displayed image GE1 related to the image data DS1 is visually recognized in a blurred manner.

Next, in step S14, the operator PB of the editing apparatus 70 enters an editing instruction RE1 for the submitted data DN, using such non-equivalent decrypted images (images for editing) GE1. For example, an editing instruction RE1 for "moving page 3 to immediately before page 1 in the submitted data DN" is entered by a mouse operation (a drag-and-drop operation) and the like to move a thumbnail image for page 3 to the left side of a thumbnail image for page 1.

When the editing apparatus 70 accepts the editing instruction RE1, the editing apparatus 70 generates editing content data DE (DE1) representing an editing content based on the editing instruction RE1. The editing instruction RE1 is converted to a script and the like indicating the content of the editing instruction (editing content), and the script or the like is described in the editing content data DE1. Then, the editing apparatus 70 transmits the editing content data DE1 to the printing apparatus 50 (step S14). By this, the editing content data DE1 having the script and the like regarding the editing content is transmitted to the printing apparatus 50. In addition, the editing apparatus 70 allows submitted data (encrypted data) DN to be transferred again from the submitted-data store 30 to the printing apparatus 50.

In step S15, the printing apparatus 50 actually performs an editing process and thereby creates images (edited images) GE2 having been subjected to the editing process. Specifically, the printing apparatus 50 generates data on "non-equivalent decrypted images" which are decrypted images non-equivalent to printed materials related to the submitted data DN, as data DS2 for displaying the edited images GE2. Note that the edited images GE2 are also represented as images for checking the editing content (images for checking). In addition, the edited images GE2 are images for a checking task among editing tasks and thus are also represented as images for editing.

More specifically, the output control unit 61 of the printing apparatus 50 first decrypts a part or all (here, all) of the submitted data (encrypted data) DN again using the decrypting unit 63. In addition, the output control unit 61 performs an editing process on the decrypted images related to the submitted data DN, based on the script described in the editing content data DE1. Specifically, an editing process in which "(original) page 3 is moved to immediately before page 1" is performed. The output control unit 61 further performs a resolution reduction process on image data DS0 (decrypted image) for each page having been subjected to the editing process, and thereby generates image data DS2 which is image data of a "non-equivalent decrypted image". By this, each thumbnail image data DS2 (thumbnail image data after the change of page order) is generated for its original image data DS0.

Thereafter, the printing apparatus 50 transmits, using the communicating unit 54 and the like, three image data units DS2 for three pages to the editing apparatus 70, as data for displaying the edited images GE2.

Figure 6:
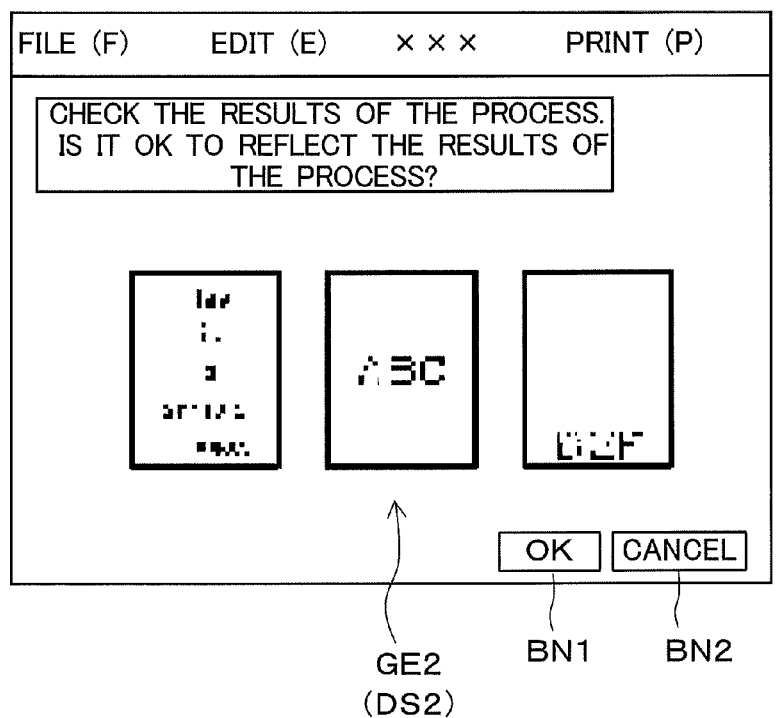
FIG. 6 is a diagram showing a screen on which images for checking are displayed.

When the editing apparatus 70 receives the data DS2 for display, the editing apparatus 70 displays the edited images GE2 on the display unit 77 thereof, based on the data DS2 for display (step S16). In other words, the editing apparatus 70 displays "non-equivalent decrypted images" created based on the data DS2 for display, as the edited images GE2. For example, as shown in FIG. 6, three page images created based on the data DS2 for display are displayed on the display unit 77 so as to be sequentially arranged from the left to the right in page order. Note that since image data DS2 for each page has a lower resolution than its original image data DS0, a displayed image related to the image data DS2 is visually recognized in a blurred manner.

The operator PB visually recognizes an updated screen on the display unit 77 and checks the results of the above-described editing process (step S17). For example, the operator PB verifies, based on the display screen in FIG. 6, that the page order has been changed as instructed, and presses an OK button BN1. In response to the pressing of the OK button BN1, the editing apparatus 70 allows the submitted-data store 30 to save the above-described editing content data DE1 in association with the submitted data DN. By this, the editing process is completed. Note that, when the operator PB determines that a change different from his/her intention has been made, the operator PB can cancel the above-described editing process by pressing a cancel button BN2. When a cancel operation is performed, the editing content data DE1 is deleted and thus the editing content is not saved.

According to the operations such as those described above, the printing apparatus 50 creates, as an image for editing, a non-equivalent decrypted image GE1 (, GE2) based on an image obtained by decrypting submitted data DN using the decrypting unit 63 thereof. Then, the editing apparatus 70 displays the non-equivalent decrypted image GE1 (, GE2) as an image for editing. Therefore, an editing operation by the editing apparatus 70 is allowed while maintaining a state in which only the decrypting unit 63 of the printing apparatus 50 can perform a decryption process of submitted data DN. Accordingly, flexibility in revision can be improved while ensuring security.

In particular, in the editing apparatus 70, the non-equivalent decrypted image GE1 (, GE2) (which is a decrypted image non-equivalent to an original printed material) is displayed as an image for editing and an image equivalent to the original printed material is not displayed. Therefore, comparing with the case in which image display in the editing apparatus 70 is allowed without limitation (the case in which an image equivalent to an original printed material is displayed), the risk of leakage of information equivalent to the original printed material from the editing apparatus 70 can be avoided or suppressed.

More specifically, upon editing by the editing apparatus 70, a thumbnail image (low-resolution image) related to submitted data DN is displayed as an image for editing and a high-definition image equivalent to a printed material related to the submitted data DN is not displayed. Therefore, the risk of leakage of confidential information from displayed content on the display unit 77 upon editing can be avoided or suppressed. More specifically, the risk of direct acquisition of information on submitted data DN by an operator who has viewed the display unit 77 of the editing apparatus 70, a person who has sneaked a look at the display unit 77 of the editing apparatus 70, a person who has secretly photographed the display unit 77 of the editing apparatus 70, or the like, can be avoided or suppressed.

Note that when "Correct Tilt" or "Invert" in the "Edit" menu is selected, too, similar operations to those described above are performed and thus the same effects can be obtained.

<2-3. Editing Operations for "Remove Dust">

Next, editing operations, etc., for "Remove Dust" will be described.

Here, a situation is assumed in which the operator PB of the editing apparatus 70 has received, through contact by phone, email, or the like, a revision instruction from the submitter PA, specifically, a revision instruction for "removing dust near a location at the center in an up-down direction and 5 cm from the left on page 1".

Figure 7:
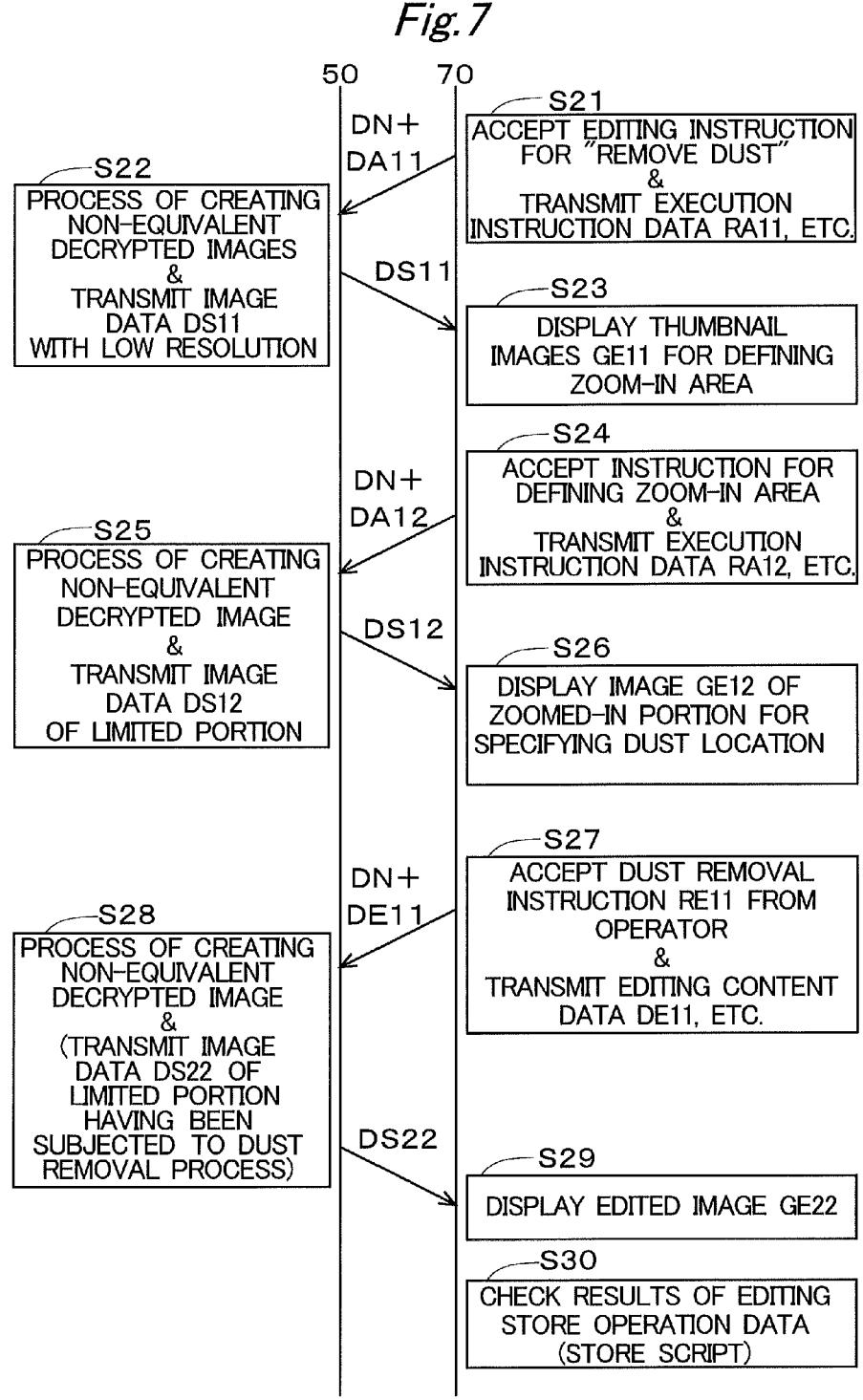
FIG. 7 is a diagram showing editing operations for "Remove Dust"

FIG. 7 is a diagram showing editing operations performed in such a situation.

First, the operator PB selects "Remove Dust" in "Edit" from among a plurality of menu items on the menu screen MN (FIG. 3) and provides an execution instruction RA11 for the selected item. In response to this selection operation, the editing apparatus 70 transmits submitted data DN and execution instruction data DA11 corresponding to the execution instruction RA11 to the printing apparatus 50 (step S21). Specifically, the editing apparatus 70 allows submitted data (encrypted data) DN to be transferred from the submitted-data store 30 to the printing apparatus 50 and transmits execution instruction data DA11 to the printing apparatus 50 (step S21). The execution instruction data (also simply referred to as an execution instruction) DA11 is also instruction data for performing a process of creating images GE11 for editing used for an editing operation (a "Remove Dust" operation), using the decrypting unit 63. Namely, the execution instruction DA11 is also an instruction for performing a process of creating images GE11 for editing.

In response to this, the printing apparatus 50 generates data DS11 for displaying the images GE11 for editing, based on the execution instruction DA11 and the submitted data DN (step S22). Here, it is assumed that the same data as the above-described data DS1 for display is generated as the data DS11 for display.

Thereafter, the printing apparatus 50 transmits, using the communicating unit 54, etc., the data DS11 for displaying the images GE11 for editing to the editing apparatus 70 (step S22).

Figure 8:
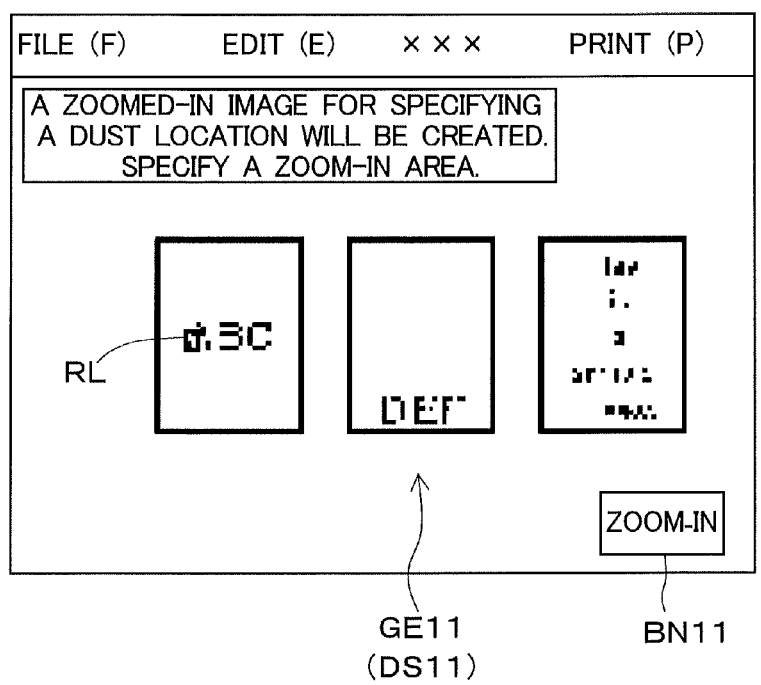
FIG. 8 is a diagram showing a screen on which images for editing are displayed.

When the editing apparatus 70 receives the data DS11 for display, the editing apparatus 70 displays the images GE11 for editing on the display unit 77 thereof, based on the data DS11 for display (step S23). For example, as shown in FIG. 8, three page images (thumbnail images) GE11 created based on the data DS11 for display are displayed on the display unit 77 so as to be sequentially arranged from the left to the right in page order. Since image data DS11 for each page has a lower resolution than its original image data DS0, a displayed image GE11 related to the image data DS11 is visually recognized in a blurred manner.

The operator PB now provides an instruction RA12 for defining a zoom-in area using the displayed images GE11, to create a zoomed-in image for specifying a dust removal location. Specifically, the operator PB moves a rectangular region RL (see FIG. 8) for defining a zoom-in area to a desired location by a mouse operation, etc., and presses a zoom-in button BN11. The rectangular region RL preferably has an area smaller than a very small percentage (e.g., several % to 10%) of the whole image. Note that although here the rectangular region RL has a size of a fixed, predetermined percentage, the size is not limited thereto and the size may be changeable. Note, however, that the maximum size of the rectangular region RL is preferably set to a relatively small value with respect to the entire area (e.g., the order of several % to 10% of the entire area).

In response to such an execution instruction RA12, the editing apparatus 70 allows submitted data (encrypted data) DN to be transferred from the submitted-data store 30 to the printing apparatus 50 and also transmits execution instruction data DA12 corresponding to the execution instruction RA12 to the printing apparatus 50 (step S24). The execution instruction data (also simply referred to as an execution instruction) DA12 is instruction data for defining a zoom-in area in the whole image and creating a partially zoomed-in image for specifying a dust location.

In response to this, the printing apparatus 50 generates data DS12 for displaying an image GE12 for editing, based on the execution instruction DA12 and the submitted data DN (step S25).

Specifically, the printing apparatus 50 first decrypts a part or all (here, a part, more specifically, only page 1) of the submitted data (encrypted data) DN using the decrypting unit 63.

Then, the output control unit 61 of the printing apparatus 50 generates, as data DS12 for displaying an image GE12 for editing, data on a "non-equivalent decrypted image" which is a decrypted image non-equivalent to a printed material related to the submitted data DN. More specifically, the output control unit 61 performs a part extraction process (partial extraction process) in which a part of the temporarily decrypted image data is extracted, and thereby generates image data DS12 of an image which is obtained by decrypting only a partial area of the whole image related to a printed material. The image related to the image data DS12 corresponds to an image obtained by decrypting only a partial area of the whole image (page image), in other words, an image in which at least a part of information on an original image is substantially lost, and is non-equivalent to the original image (whole image) related to image data DS0, and thus, is also referred to as a "non-equivalent decrypted image". Note that the image data DS12 is also represented as a "partially decrypted image", etc. Note also that the "partial extraction process" is a process of changing an image to be processed to an image (non-equivalent image) which is not equivalent to the image related to the image data DS0, and thus, is also represented as a "non-equivalence process".

For example, the output control unit 61 generates, using the decrypting unit 63, image data DS0 (e.g., image data having pixels, the number of which is equivalent to 300 dpi) obtained by decrypting an image for page 1 related to the submitted data DN. The output control unit 61 further generates image data DS12 of an image (here, image data having pixels, the number of which is equivalent to a resolution (300 dpi) equivalent to the resolution of the original printed material) obtained by extracting only a part of the image data DS0 of the decrypted image for page 1 (a portion corresponding to the rectangular region RL). Note, however, that as described above, the image GE12 related to the image data DS12 corresponds to an image obtained by decrypting only a partial area (e.g., an area on the order of several % to 10%) of the whole image.

Thereafter, the printing apparatus 50 transmits, using the communicating unit 54, etc., the image data DS12 of a partially zoomed-in image to the editing apparatus 70, as data for displaying the image GE12 for editing (step S25).

Figure 9:
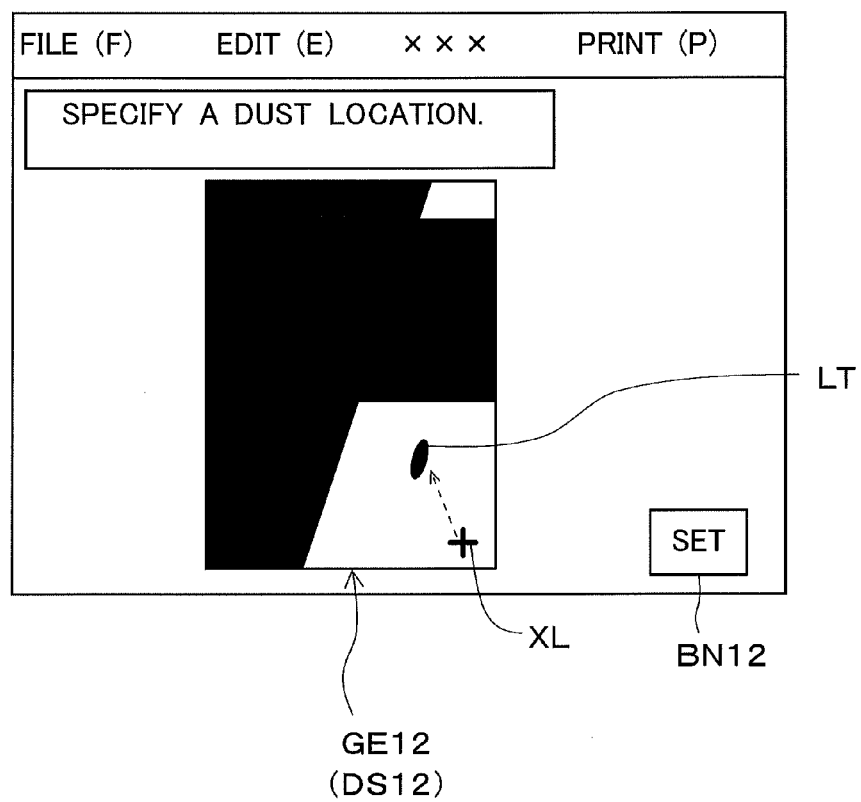
FIG. 9 is a diagram showing a screen on which an image for editing is displayed.

When the editing apparatus 70 receives the data DS12 for display, as shown in FIG. 9, the editing apparatus 70 displays the image for editing (partially zoomed-in image) GE12 on the display unit 77 thereof, based on the data DS12 for display (step S26). In other words, the editing apparatus 70 displays a "non-equivalent decrypted image" created based on the data DS12 for display, as the image GE12 for editing. The image GE12 for editing is limited to a partial area of the whole image for page 1 and thus the whole image is not displayed.

Then, in step S27, the operator PB of the editing apparatus 70 enters an editing instruction RE11 for the submitted data DN, using such a non-equivalent decrypted image (image for editing) GE12. For example, the location of dust LT (dust location) in the partially zoomed-in image for page 1 is specified using a cross cursor XL and a set button BN12. When the cross cursor XL is moved to a dust location and then the set button BN12 is pressed, the editing apparatus 70 determines that an editing instruction RE11 for specifying the coordinate location of the cross cursor XL as the dust location has been entered.

When the editing apparatus 70 accepts the editing instruction RE11, the editing apparatus 70 generates editing content data DE11 representing an editing content based on the editing instruction RE11. The editing instruction RE11 is converted to a script and the like indicating the content of the editing instruction (editing content), and the script and the like is described in the editing content data DE11. The editing content data DE11 includes instruction information for performing a "Remove Dust" editing process and its detailed information (information on page number "1" which is a target page for a dust removal process and on the coordinate location (X, Y) of the dust LT in the page). Then, the editing apparatus 70 transmits the editing content data DE11 to the printing apparatus 50 (step S27). By this, the editing content data DE11 having the script and the like regarding the editing content is transmitted to the printing apparatus 50. In addition, the editing apparatus 70 allows submitted data (encrypted data) DN to be transferred again from the submitted-data store 30 to the printing apparatus 50.

In step S28, the printing apparatus 50 generates data on a "non-equivalent decrypted image" which is a decrypted image non-equivalent to a printed material related to the submitted data DN, as data DS22 for displaying an edited image GE22.

Specifically, the output control unit 61 of the printing apparatus 50 first decrypts a part or all (here, a part, more specifically, only page 1) of the submitted data (encrypted data) DN again using the decrypting unit 63. In addition, the output control unit 61 performs a partial extraction process on image data DS0 (decrypted image) for page 1 and thereby generates image data DS21 which is data of a "non-equivalent decrypted image" (specifically, a partially extracted image).

The output control unit 61 further performs an editing process on the image data DS21, based on the script described in the editing content data DE11. Specifically, a dust removal process in which "to remove dust at the coordinate location (X, Y) on page 1" is performed.

By this, partially extracted image data DS22 for page 1 (partially extracted image data having been subjected to the dust removal process) is generated.

Thereafter, the printing apparatus 50 transmits, using the communicating unit 54 and the like, the partially extracted image data DS22 for page 1 having been subjected to the dust removal process to the editing apparatus 70, as data for displaying the edited image GE22.

Figure 10:
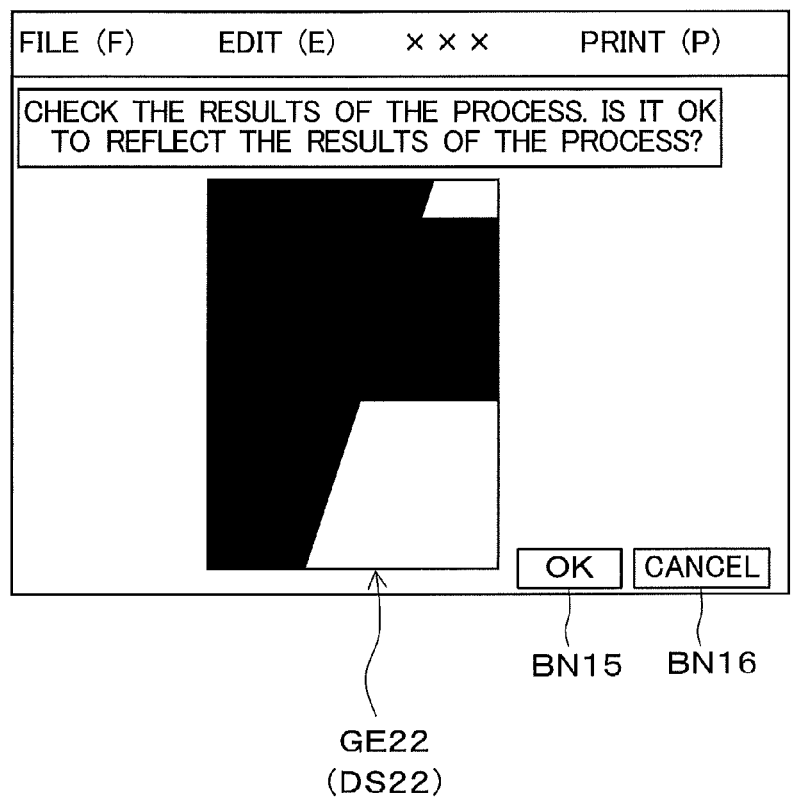
FIG. 10 is a diagram showing a screen on which an image for checking is displayed.

When the editing apparatus 70 receives the data DS22 for display, the editing apparatus 70 displays the edited image GE22 on the display unit 77 thereof, based on the data DS22 for display (step S29). For example, as shown in FIG. 10, a partially extracted image (a partial image having been subjected to the dust removal process) created based on the data DS22 for display is displayed on the display unit 77. Note that the data DS22 for display is data for a partial area of the whole image for page 1. In other words, the editing apparatus 70 displays a "non-equivalent decrypted image" created based on the data DS22 for display, as the edited image GE22.

Then, the operator PB visually recognizes an updated screen on the display unit 77 and checks the results of the above-described editing process (step S30). For example, the operator PB verifies, based on the display screen in FIG. 10, that the "dust" has been removed as instructed, and presses an OK button BN15. In response to the pressing of the OK button BN15, the editing apparatus 70 allows the submitted-data store 30 to save the above-described editing content data DE11 in association with the submitted data DN. By this, the editing process is completed. Note that, when the operator PB determines that a change different from his/her intention has been made, the operator PB can cancel the above-described editing process by pressing a cancel button BN16. When a cancel operation is performed, the editing content data DE11 is deleted and thus the editing content is not saved.

According to the operations such as those described above, the printing apparatus 50 creates, as an image for editing, a non-equivalent decrypted image which is a decrypted image non-equivalent to a printed material related to submitted data DN, based on an image obtained by decrypting the submitted data DN using the decrypting unit 63 thereof, and transmits the non-equivalent decrypted image to the editing apparatus 70. Then, the editing apparatus 70 displays the non-equivalent decrypted image as an image for editing. Therefore, an editing operation by the editing apparatus 70 is allowed while maintaining a state in which only the decrypting unit 63 of the printing apparatus 50 can perform a decryption process of submitted data DN. Accordingly, flexibility in revision can be improved while ensuring security. In particular, in the editing apparatus 70, non-equivalent decrypted images GE11, GE12, and GE22 (which are decrypted images non-equivalent to original printed materials) are displayed as images for editing and images equivalent to the original printed materials are not displayed. Therefore, comparing with the case in which image display in the editing apparatus 70 is allowed without limitation (the case in which an image equivalent to an original printed material is displayed), the risk of leakage of information equivalent to the original printed material from the editing apparatus 70 can be avoided or suppressed.

In addition, particularly upon editing by the editing apparatus 70, thumbnail images (low-resolution images) GE11 (FIG. 8) related to submitted data DN are displayed as images for editing and high-definition images equivalent to printed materials related to the submitted data DN are not displayed. Therefore, the risk of leakage of confidential information from displayed content on the display unit 77 upon editing can be avoided or suppressed.

In addition, particularly upon editing by the editing apparatus 70, a partially extracted image GE12 (FIG. 9) related to submitted data DN is displayed as an image for editing and the whole image equivalent to a printed material related to the submitted data DN is not displayed. Namely, an image displayed on the display unit 77 is not the whole image but only a part of the whole image. Therefore, the risk of leakage of confidential information from displayed content on the display unit 77 upon editing can be avoided or suppressed.

Note that when "Eraser" or "Bold" in the "Edit" menu is selected, too, similar operations to those performed when "Remove Dust" is selected are performed and thus the same effects can be obtained.

<2-4. Editing Operations for "Correct Misspellings">

Next, editing operations and the like for "Correct Misspellings" will be described.

Editing operations for "Correct Misspellings" are performed in a manner similar to that for the above-described editing operations for "Remove Dust". The following will mainly describe differences.

In this "Correct Misspellings", instead of specifying a "dust location", a "misspelled location" is specified and "characters" before and after change are specified.

Figure 11:
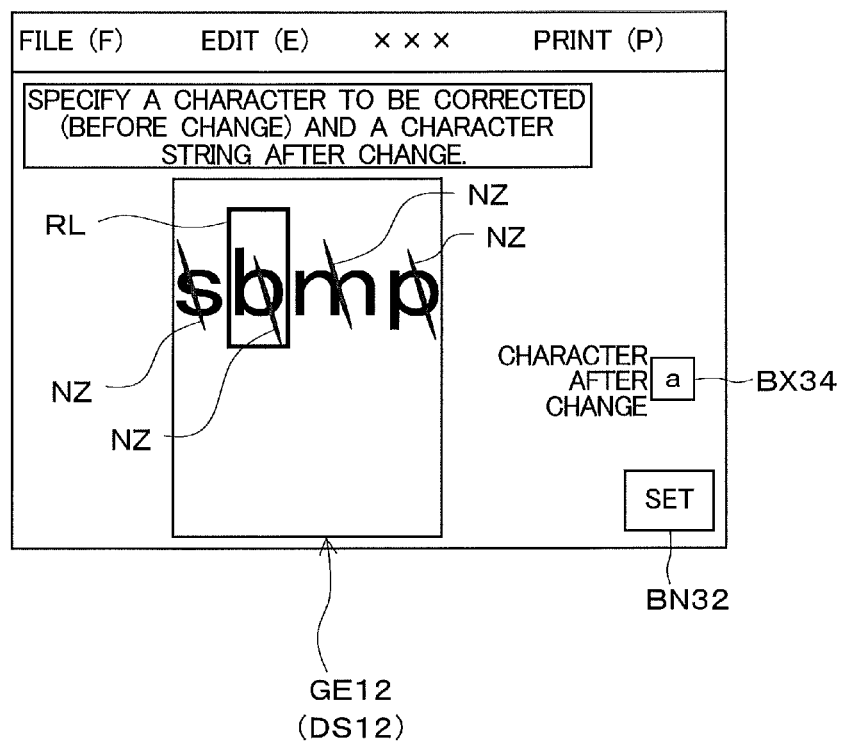
FIG. 11 is a diagram showing a screen on which an image for editing is displayed.

For example, in a process corresponding to that in step S27 (FIG. 7), using a displayed image such as that shown in FIG. 11, the operator PB specifies the location (X, Y) of a character to be changed, the character "b" before change, and the character "a" after change. Specifically, by drawing a rectangular box line RL, the character "b" to be changed and the location of the character are specified and a character after change is entered in a character string entry field BX34 and specified. When a set button BN32 is pressed, the specified content is confirmed. In addition, the page number "3" for the character to be changed is specified in a process corresponding to that in step S23 (FIG. 7). These pieces of specifying information (editing information including the page number "3" for the character to be changed, the location (X, Y) of the character to be changed, the character "b" before change, and the character "a" after change) are included in editing content data for "Correct Misspellings".

In addition, regarding "Correct Misspellings", in processes corresponding to those in steps S25 and S26, as shown in FIG. 11, an image in which noises NZs are provided to the "characters" in an extracted area (an area to be zoomed in) is created as a partially extracted image and displayed. Then, using the partially extracted image, an editing instruction accepting process and the like in step S27 are performed.

According to this, in addition to being able to obtain the same effects as those obtained upon the above-described editing for "Remove Dust", characters in a displayed image can also be prevented from being encoded using Optical Character Recognition (OCR) technology. Namely, "characters as an image" can be prevented from being converted to "encoded characters". Therefore, it becomes difficult to make secondary use of information displayed on a display screen, enabling further improvement of a deterrent effect on data leakage.

<2-5. Print Operations>

Thereafter, submitted data DN is decrypted using the decrypting unit 63 (see FIG. 2) included in the printing apparatus 50, and can be printed out by the printing apparatus 50. Specifically, after an editing process such as those described above, the operator PB of the editing apparatus 70 can allow the printing apparatus 50 to perform a printing process of the submitted data DN by, for example, selecting the menu item "Print". Note that the printing process may be performed immediately after the above-described editing process or may be performed after a lapse of a predetermined period from the completion of the above-described editing process.

Figure 12:
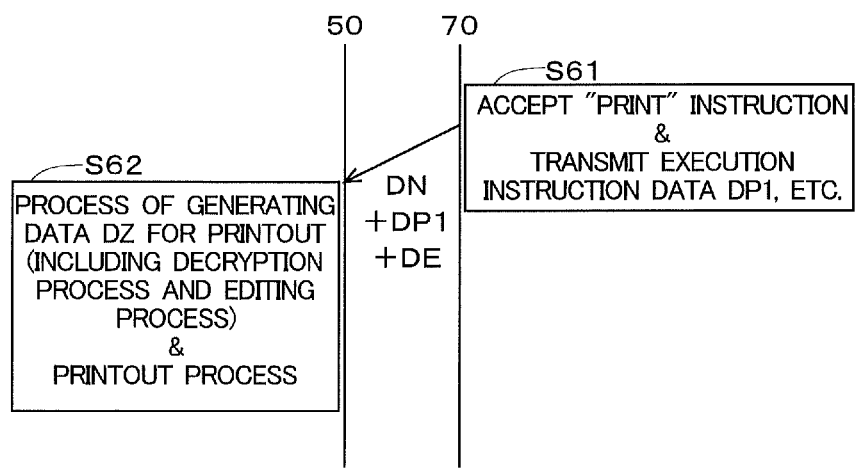
FIG. 12 is a diagram showing printing operations.

FIG. 12 is a diagram showing such printing operations.

As shown in FIG. 12, in step S61, first, the operator PB of the editing apparatus 70 enters a print instruction RP1 for submitted data DN by, for example, selecting the menu item "Print". When the editing apparatus 70 accepts the print instruction RP1, the editing apparatus 70 generates print instruction data DP1 in which the print instruction RP1 is described as a script. Then, the editing apparatus 70 transmits the print instruction data DP1, the above-described editing content data DE (DE1, DE11, etc.), the submitted data (encrypted data) DN to the printing apparatus 50. Specifically, the editing apparatus 70 transmits these data units DP1, DE, and DN to the printing apparatus 50 through the submitted-data store 30.

Then, when the printing apparatus 50 receives the print instruction data DP1 and the like, the printing apparatus 50 generates data DZ for printout (step S62).

Specifically, the output control unit 61 of the printing apparatus 50 first decrypts all of the submitted data (encrypted data) DN using the decrypting unit 63 and thereby generates image data DS0 of decrypted images.

Then, the output control unit 61 performs an editing process again on the decrypted image data DS0 based on the script described in the editing content data DE and thereby generates data DZ for printout.

For example, upon printout after the above-described page change editing, an editing process in which "(original) page 3 is moved to immediately before page 1" (an editing process described in the editing content data DE1) is performed again on the decrypted image data DS0. Then, based on the results of the editing process, data DZ (DZ1) for printout is generated. Note, however, that the data DZ for printout is generated without involving a non-equivalence process (a resolution reduction process and a partial extraction process). Namely, the data DZ for printout has the same resolution as the original resolution of printed materials, and is data pertaining to images of the whole areas of the printed materials. Note that the images related to the data DZ for printout are images equivalent to images related to the submitted data DN and thus are also referred to as "equivalent decrypted images". In addition, the images related to the data DZ for printout are images obtained by completely decrypting the submitted data DN, and thus, are also referred to as "completely decrypted images".

Alternatively, upon printout after the above-described dust removal editing, an editing process in which "dust at the coordinate location (X, Y) on page "1" is removed" (an editing process described in the editing content data DE11) is performed again, thereby generating data DZ (DZ11) for printout pertaining to "equivalent decrypted images" where the results of the editing process are reflected.

Upon a printout process after other various editing processes, too, likewise, an editing process is further performed on a decrypted image based on a script described in editing content data DE, thereby generating data DZ for printout pertaining to "equivalent decrypted images" where the results of the editing process are reflected.

Then, the printing apparatus 50 performs a printout operation based on the data DZ for printout and thereby prints out printed materials related to the submitted data DN, specifically, printed materials having been subjected to the editing process (the "Change Pages" process and/or the "Remove Dust" process, etc.). By this, printout materials where the results of the editing process are reflected are produced.

<3. Others>

Although the embodiment of the present invention has been described above, the present invention is not limited to the content described above.

For example, although the above-described embodiment exemplifies the case in which submitted data DN is transmitted one by one (transmitted a plurality of times) to the printing apparatus 50 along with the transmission of data DA and DE, the present invention is not limited thereto. Specifically, submitted data DN may be transmitted to the printing apparatus 50 at an initial stage after accepting an editing operation (e.g., upon transmission of first data DA) and may remain saved in the printing apparatus 50 until the time when an editing process is completed. Namely, only the first one transmission of submitted data DN may be performed. According to this, the number of transmissions of submitted data DN is reduced, enabling the suppression of a communication load (communication time, etc.) required for data transmission of the submitted data DN.

In addition, although the above-described embodiment exemplifies the case in which the submitted-data store 30 is provided separately from the printing apparatus 50 and the editing apparatus 70, the present invention is not limited thereto. For example, the submitted-data store 30 may be included in the printing apparatus 50 or may be included in the editing apparatus 70.

In addition, although the above-described embodiment mainly exemplifies the case in which an editing process for one editing item is performed on one submitted data DN, the present invention is not limited thereto. For example, editing processes for a plurality of editing items may be sequentially performed on one submitted data DN. In this case, in an editing process for an nth editing item, a non-equivalent decryption process is performed in which, after performing an editing process(es) for an editing item(s) before the nth editing item (an editing item(s) before an (n-1)th editing item) according to editing content data DE, an editing process for the nth editing item is also performed according to the editing content data DE. Note that in the editing content data DE, scripts indicating editing contents regarding a plurality of editing items are sequentially described. In addition, upon printout, a decryption process is performed according to the editing content data DE in which the editing contents regarding the plurality of editing items are described.

In addition, although the above-described embodiment exemplifies the case in which when the editing apparatus 70 accepts an execution instruction of an editing process and checks an editing content, too, the printing apparatus 50 actually performs an editing process, the present invention is not limited thereto. For example, upon checking an editing content, an editing process by the printing apparatus 50 may not be performed and images for checking (images for editing) GE2 and GE22 for checking the editing content may be created by the editing apparatus 70.

While the invention has been shown and described in detail, the foregoing description is in all aspects illustrative and not restrictive. It is therefore understood that numerous modifications and variations can be devised without departing from the scope of the invention.

What is claimed is:

1. A printing system that performs printout based on encrypted, submitted data, the printing system comprising:
   a printing apparatus including a decrypting unit that decrypts the submitted data; and
   an editing apparatus that accepts an editing operation to be performed on the submitted data, wherein
   the editing apparatus transmits an execution instruction for performing a process of creating an image for editing used for the editing operation, to the printing apparatus,
   the printing apparatus performs, in response to the execution instruction, a process on an image obtained by decrypting the submitted data using the decrypting unit, and thereby creates a non-equivalent decrypted image as the image for editing, and transmits the non-equivalent decrypted image to the editing apparatus, the non-equivalent decrypted image being a decrypted image non-equivalent to a printed material related to the submitted data, and
   the editing apparatus displays the non-equivalent decrypted image as the image for editing.

2. The printing system according to claim 1, wherein the editing apparatus accepts an editing instruction for the submitted data using the non-equivalent decrypted image, and causes editing content data to be saved in association with the submitted data, the editing content data representing an editing content based on the editing instruction.

3. The printing system according to claim 2, wherein the printing apparatus performs an editing process based on the editing content data, on the image obtained by decrypting the submitted data using the decrypting unit, and thereby creates an image for printout having been subjected to the editing process, and prints out the image for printout.

4. The printing system according to claim 1, wherein the non-equivalent decrypted image is a decrypted image of a partial area of a whole image related to the printed material.

5. The printing system according to claim 1, wherein the non-equivalent decrypted image is a decrypted image having a lower resolution than an original image related to the submitted data.

6. The printing system according to claim 5, wherein the non-equivalent decrypted image is a thumbnail image of the original image.

* * * * *